United States Patent
Sebastian

(10) Patent No.: US 10,502,833 B2
(45) Date of Patent: Dec. 10, 2019

(54) MULTIPLE BEAM RANGE MEASUREMENT PROCESS

(71) Applicant: DSCG SOLUTIONS, INC., Chantilly, VA (US)

(72) Inventor: Richard Sebastian, Frederick, MD (US)

(73) Assignee: DSCG Solutions, Inc., Chantilly, VA (US)

(*) Notice: Subject to any disclaimer, the term of this patent is extended or adjusted under 35 U.S.C. 154(b) by 622 days.

(21) Appl. No.: 14/994,998

(22) Filed: Jan. 13, 2016

(65) Prior Publication Data
US 2017/0199279 A1    Jul. 13, 2017

Related U.S. Application Data

(60) Provisional application No. 62/102,901, filed on Jan. 13, 2015.

(51) Int. Cl.
*G01S 17/58* (2006.01)
*G01C 3/08* (2006.01)
(Continued)

(52) U.S. Cl.
CPC .......... *G01S 17/58* (2013.01); *G01B 9/02004* (2013.01); *G01B 9/02019* (2013.01);
(Continued)

(58) Field of Classification Search
CPC ......... G01C 11/02; G01S 7/491; G01S 17/42; G01S 17/89; G01S 17/58; G01S 17/325;
(Continued)

(56) References Cited

U.S. PATENT DOCUMENTS

| 4,967,270 A | 10/1990 | Ulich et al. |
| 5,164,823 A | 11/1992 | Keeler et al. |

(Continued)

FOREIGN PATENT DOCUMENTS

| CN | 102278973 A | 12/2011 |
| CN | 103557927 A | 2/2014 |

(Continued)

OTHER PUBLICATIONS

PCT/US2016/013264, "International Search Report and Written Opinion Received", dated Mar. 17, 2016, 9 pages.

(Continued)

*Primary Examiner* — Luke D Ratcliffe
(74) *Attorney, Agent, or Firm* — Brake Hughes Bellermann LLP

(57) ABSTRACT

In one general aspect, an apparatus can include a first laser subsystem configured to transmit a first laser beam at a first location on an object at a time and a second laser subsystem configured to transmit a second laser beam at a second location on the object at the time. The apparatus can include an analyzer configured to calculate a first velocity based on a first reflected laser beam reflected from the object in response to the first laser beam. The analyzer can be configured to calculate a second velocity based on a second reflected laser beam reflected from the object in response to the second laser beam. The first location can be targeted by the first laser subsystem and the second location can be targeted by the second laser subsystem such that the first velocity is substantially the same as the second velocity.

20 Claims, 3 Drawing Sheets

(51) Int. Cl.
*G01S 17/32* (2006.01)
*G01S 17/87* (2006.01)
*G01B 9/02* (2006.01)
*G01H 9/00* (2006.01)

(52) U.S. Cl.
CPC ............... *G01C 3/08* (2013.01); *G01H 9/00* (2013.01); *G01S 7/4915* (2013.01); *G01S 17/325* (2013.01); *G01S 17/87* (2013.01)

(58) Field of Classification Search
CPC G06T 7/2033; G06T 7/60; G06T 7/70; G06T 7/246; G06K 9/52; G06K 9/00744; G06K 9/00335; H04N 13/021
See application file for complete search history.

(56) References Cited

U.S. PATENT DOCUMENTS

| | | | |
|---|---|---|---|
| 5,825,464 A * | 10/1998 | Feichtner | G01S 7/4813 356/4.02 |
| 6,448,923 B1 | 9/2002 | Zrnic et al. | |
| 6,646,725 B1 | 11/2003 | Eichinger et al. | |
| 7,705,972 B2 * | 4/2010 | Holton | G01S 17/88 356/28 |
| 2003/0021309 A1 | 1/2003 | Mattox | |
| 2007/0091316 A1 | 4/2007 | Lal et al. | |
| 2007/0273863 A1 | 11/2007 | Leep et al. | |
| 2008/0088503 A1 | 4/2008 | Beasley | |
| 2010/0182587 A1 | 7/2010 | Fluckiger et al. | |
| 2010/0271615 A1 * | 10/2010 | Sebastian | G01C 11/02 356/4.01 |
| 2011/0102764 A1 | 5/2011 | Walsh et al. | |
| 2011/0216304 A1 | 9/2011 | Hall et al. | |
| 2013/0308119 A1 | 11/2013 | Chung et al. | |
| 2015/0055115 A1 | 2/2015 | Pedersen et al. | |

FOREIGN PATENT DOCUMENTS

| | | |
|---|---|---|
| WO | 2006034211 A2 | 3/2006 |
| WO | 2014035844 A2 | 3/2014 |

OTHER PUBLICATIONS

Smith, Philip W. et al., "Object Motion and Structure Recover for Robotic Vision Using Scanning Laser Range Sensors", IEEE Transactions on Robotics and Automation, vol. 13, No. 1, Feb. 1997, 7 pages.

Extended European Search Report for European Application No. 16737824.9, dated Jul. 27, 2018, 13 pages.

International Preliminary Report on Patentability for PCT Application PCT/US2016/013264, dated Jul. 27, 2017, 3 pages.

MacPherson et al., "Multipoint laser vibrometer for modal analysis", Optical Society of America; Applied Optics, vol. 46, No. 16; Jun. 1, 2007; pp. 3126-3132.

First Office Action for Chinese Application No. 201680009905.2, dated Jun. 25, 2019, 8 pages.

* cited by examiner

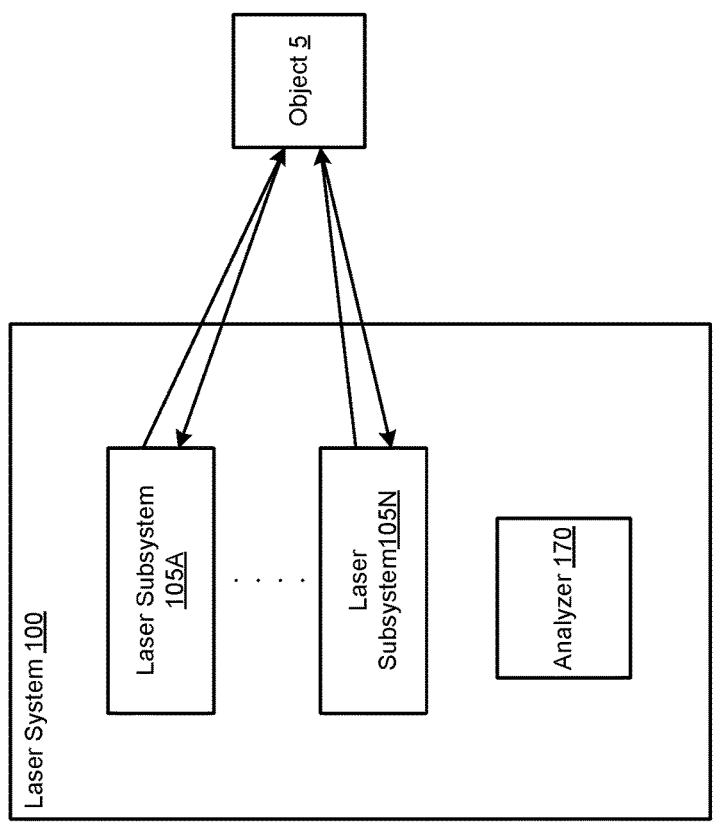

MULTIPLE BEAM RANGE MEASUREMENT PROCESS

RELATED APPLICATION

This application claims priority to and the benefit of U.S. Provisional Patent Application No. 62/102,901, filed on Jan. 13, 2015, which is incorporated herein by reference in its entirety.

TECHNICAL FIELD

This description relates to a multiple beam laser LIght Detection And Ranging (LIDAR) system.

BACKGROUND

In some known LIDAR systems, a laser may be used to estimate range and velocity of a moving object. However, known LIDAR systems used in metrology are often relatively slow and inefficient. Thus, a need exists for systems, methods, and apparatus to address the shortfalls of present technology and to provide other new and innovative features.

SUMMARY

In one general aspect, an apparatus can include a first laser subsystem configured to transmit a first laser beam at a first location on an object at a time and a second laser subsystem configured to transmit a second laser beam at a second location on the object at the time. The apparatus can include an analyzer configured to calculate a first velocity based on a first reflected laser beam reflected from the object in response to the first laser beam. The analyzer can be configured to calculate a second velocity based on a second reflected laser beam reflected from the object in response to the second laser beam. The first location can be targeted by the first laser subsystem and the second location can be targeted by the second laser subsystem such that the first velocity is substantially the same as the second velocity.

BRIEF DESCRIPTION OF THE DRAWINGS

FIG. 1A is a diagram that illustrates a laser system including multiple laser subsystems.

DETAILED DESCRIPTION

FIG. 1A is a diagram that illustrates a laser system 100 (also can be referred to as a LIght Detection And Ranging (LIDAR) system) configured to use multiple laser subsystems 105A through 105N to produce or measure ranges and/or velocities of an object 5 that can be stationary or moving with respect to the laser system 100. In some implementations, the multiple laser systems 105A through 105N can be configured to transmit one or more laser beams. Accordingly, the laser system 100 can be configured to produce an array of lasers for, for example, characterization (e.g., measurement) of the object 5. In some implementations, the object 5 can be referred to as a target or as a target object 5. The laser system 100 can be used in frequency modulated continuous wave (FMCW) applications. Such applications can include metrology applications that include the characterization of surfaces (e.g., metal surfaces on vehicles (e.g., airplanes, automobiles, etc.) in a manufacturing environment).

The laser system 100 can implement a multiple beam range measurement process that can, for example, improve the speed and accuracy of range measurements within FMCW applications. As a specific example, a single settling time for the simultaneous use of multiple lasers from the laser system 100 can result in measurement efficiencies over a system with a single laser used multiple times where each use of the single laser is associated with a settling time resulting in multiple settling times. The laser system 100 can also be configured to account for various issues related to vibrations of the object 5 (which can be a rigid body object or a non-rigid body object) that can result in inaccuracies in characterization.

As shown in FIG. 1A, the LIDAR system 100 includes an analyzer 170 configured to analyze data based on laser beams produced by the laser subsystems 105A through 105N. In some implementations, the analyzing can include estimating a range and/or a velocity for one or more of the laser subsystems 105A through 105N.

Figure 1B:
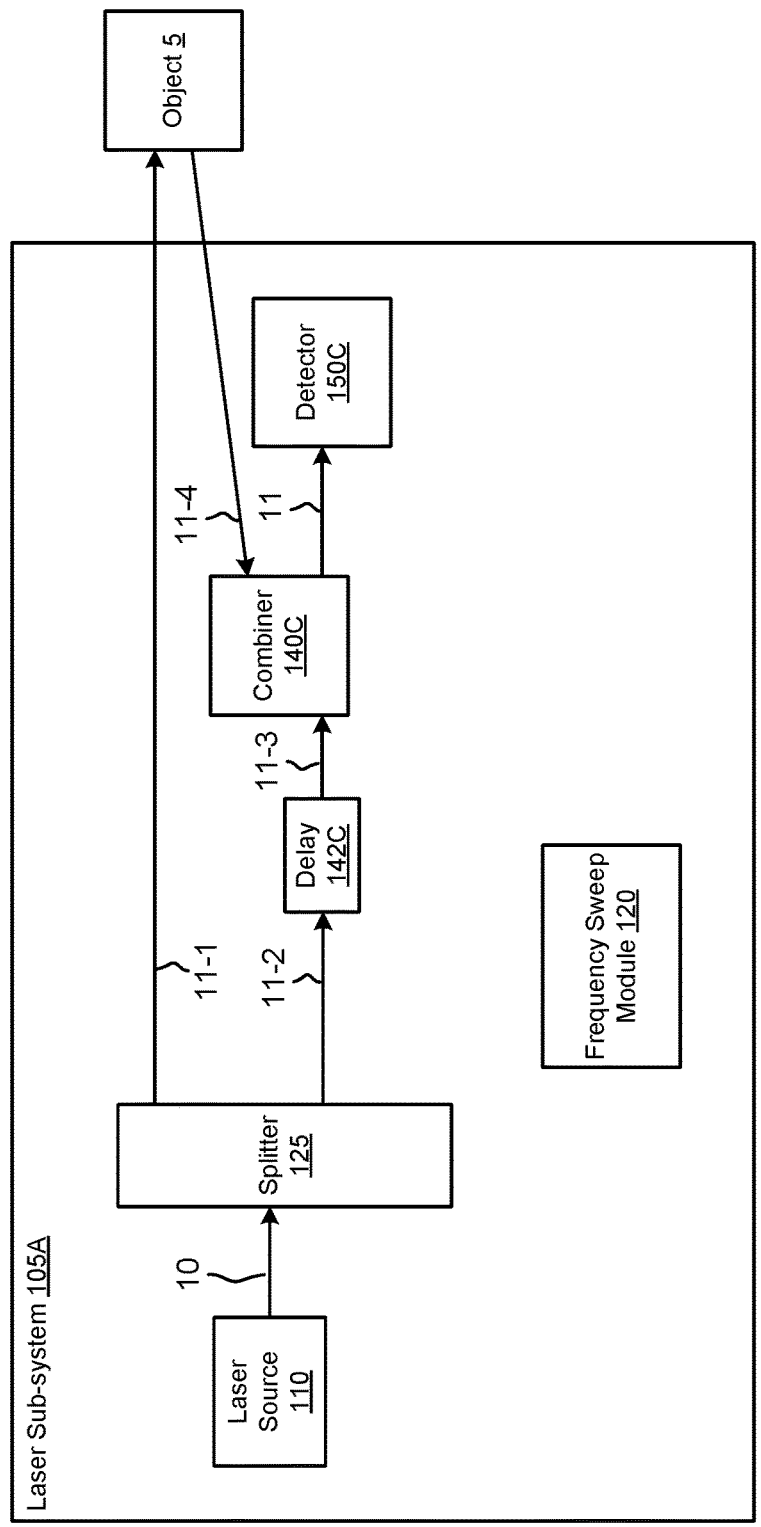
FIG. 1B is a diagram that illustrates, in more detail, components included at least one of the laser subsystems shown in FIG. 1A.

FIG. 1B is a diagram that illustrates, in more detail, components included at least one of the laser subsystems shown in FIG. 1A. The laser source 110 of the laser subsystem 105A is configured to emit (e.g., produce, propagate) electromagnetic radiation at one or more frequencies that can be, for example, a coherent light emission (e.g., monochromatic light emission) or beam. For simplicity, the emissions from the laser source 110 will be referred to as an electromagnetic radiation emission (such as electromagnetic radiation emission), an emitted laser signal 10, or as an emitted light.

As shown in FIG. 1B, the laser signal 10 can be split by the splitter 125 into multiple laser signals such as at least laser signals 11-1 and 11-2. In some implementations, the laser signal 11 can be derived from a split laser signal and can be referred to as combined laser signal. As shown in FIG. 1B, an interferometer can be used to produce the laser signal 11, which may be analyzed for one or more corrections by the analyzer 170 (which can also be referred to as a demodulator) shown in FIG. 1A. In such implementations, the laser signal 10 can be further split (e.g., by splitter 125) into laser signal 11-1 and laser signal 11-2. The laser signal 11-1 can be reflected from the object 5 as laser signal 11-4. Laser signal 11-2 can be delayed by a delay 142C (which can be correlated to a length) to laser signal 11-3 and laser signal 11-3 can be combined with the laser signal 11-4 via a combiner 140C. The laser signal 11 (also can be referred to as an interferometer signal) from the interferometer can be used to gather information about the laser signal 11 using a detector 150C. Discussions related to laser signal 11 below can be applied to any of the component laser signals 11-1 through 11-4 that can be used to define laser signal 11, which can be the target laser signal or the laser signal targeted for analysis by the analyzer 170. The splitter 125 is illustrated as a single component for simplicity. In some implementations, the splitter 125 can include more than one splitter. Similarly one or more of the combiners shown in FIG. 1B may be combined or may include additional combiners.

As shown in FIG. 1B, the laser subsystem 105A includes a frequency sweep module 120 (which can be used with more than one laser subsystem). The frequency sweep module 120 is configured to trigger the laser source 110 to produce a variety of optical frequencies (also can be referred to generally as frequencies), for example, by modulating a drive current of the laser source 110. Specifically, the frequency sweep module 120 is configured to trigger laser source 110 to produce a pattern of optical frequencies (also can be referred to as a frequency pattern). For example, the frequency sweep module 120 can be configured to trigger the laser source 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern can have a cycle including an up-chirp and a down-chirp.

The laser subsystem 105A includes a combiner 140C configured to receive the laser signal 11-4 reflected (also can be referred to as a reflected laser signal or as a scattered laser signal) (not shown) from the object 5 in response to an emitted laser signal 11-1 (split from laser signal 10) from the laser source 110 toward the object 5. In some implementations, the reflected laser signal (also can be referred to as a return signal or return light) from the object 5 can be mixed with a portion of the emitted laser signal 10 (e.g., laser signal 11-3 delayed by delay 142C) and then analyzed by the analyzer 170 (after being converted to an electrical signal by detector 150C).

The analyzer 170 (which can be used with more than one laser subsystem and/or included within one or more of the laser subsystems) of the laser subsystem 105A is configured to analyze a combination of emitted laser signal 11-1 from the laser source 110 and reflected laser signal 11-4 received by the combiner 140C. The emitted laser signal 11-1 can be emitted in accordance with a pattern including an up-chirp followed by a down-chirp (or a down-chirp followed by an up-chirp). The combination of a frequency of the emitted laser signal 11-1 from the laser source 110 and a frequency of the reflected laser signal 11-4 received by the combiner 140C can be analyzed by the analyzer 170 to obtain or define a beat frequency or signal. In other words, the beat frequency can be a sum of a signal frequency change over the round trip to the object 5 (emitted laser signal) and back (reflected laser signal), and may include a Doppler frequency shift of the reflected laser signal resulting from relative range motion between the laser subsystem 105A and the object 5. In some implementations, the beat signal can have a relatively constant frequency or a varying frequency. In some implementations, a combination of a frequency of emitted laser signal 11-1 and a frequency of reflected laser signal 11-4 can be referred to as a difference frequency, a beat frequency or as a round-trip frequency.

The analyzer 170 can be configured to calculate a round-trip time period, which is a time period from the emission of the laser signal 10 to receipt of the return of the reflected laser signal. A combination of the emitted later signal 11-1 and the reflected laser signal 11-4 can collectively be referred to as a round-trip laser signal. The analyzer 170 can also be configured to calculate a range and/or a velocity based on the combination of the emitted laser signal 11-1 and the reflected laser signal 11-4.

The optical power of the laser output can change significantly during a frequency pattern such as a frequency sweep or up-chirp/down-chirp as a result of, for example, drive current modulation of the laser source 110. The frequency pattern may be non-ideal (e.g., may deviate) from a specified frequency pattern because of an imperfect drive current signal, unavoidable thermal excitations in the laser source 110, and/or so forth that can cause variations, for example, frequency, phase, and/or so forth.

A linearly-chirped FMCW LIDAR can calculate a range by determining the frequency of a delayed chirp that has traveled to the target (e.g., object 5) and back relative to the frequency of a chirp that has followed a local oscillator (LO) path within the LIDAR system 100. In some implementations, the LO path can include the path between the splitter 125 and the combiner 140C, which can include laser signal 11-2, the delay 142C, and laser signal 11-3. If the target signal is combined with (e.g., beat against) the LO signal then the frequency of the beat signal will be the difference frequency resulting from the (Range−LO) delay:

$$F = (2*Range - LO)*HZPM \qquad \text{Eq. (1)}$$

where, F=beat frequency, 2*Range=target round trip path length, LO=local oscillator path length, HZPM=(Hz/sec lidar chirp rate)/c, and c=velocity of light (meters/second).

As shown in FIG. 1B, the LO length is a length correlated to the delay 142C. The (range−LO) term can represent a length difference associated with an interferometer signal derived from the laser signal 10. In other words, the range term can be a length associated with the laser signal 10 that may include the distance to a target (e.g., object 5), and may be a round-trip distance, and the LO term can be a length associated with a delayed version of the laser signal 10. Accordingly, the (range−LO) can represent a length derived from a beating of the laser signal 10 and a delayed version of the laser signal 10.

If the target has a non-zero velocity component (linear motion or vibration) v in the direction of increasing range, as is generally the case, the Eq. (1) becomes:

$$F = (2*Range - LO)*HZPM + (v/c)*F0 \qquad \text{Eq. (2)}$$

where F0 is the carrier frequency of the LIDAR laser=c/Lambda where Lambda is the laser wavelength. In some implementations, a variation in range and/or velocity that can be tolerated can be calculated using Eq. (2). For example, a variation in range in can be calculated within a particular threshold range based on a variation in velocity using Eq. (2). Accordingly, a tolerance in velocity (e.g., linear motion or vibration) variation can be determined for a given range variation. Similarly, a tolerance in range variation can be determined for a given velocity (e.g., linear motion or vibration) variation.

If the target is vibrating so that v=v(t), we have, to a close approximation:

$$F(t) = (2*Range - LO)*HZPM + (v/c)*F0 \qquad \text{Eq. (3)}$$

If multiple simultaneous range measurements are made on a surface in close proximity we will have approximately (if the LO paths are the same and the velocities are the same at each position):

$$F_j(t) = (2*Range_j - LO)*HZPM + (v/c)*F0 \qquad \text{Eq. (4)}$$

In some implementations, the close proximity can be, for example, close enough in proximity such that displacement due to vibration at each of the locations associated with the respective range measurements are the same or at least linearly related.

The laser system 100 (and laser subsystem 105A, for example) described above with respect to FIGS. 1A and 1B can result in a variety of efficiencies. For example, in some implementations, frequency at each time point is a sum of components proportional to range and velocity (which can be noise and can be associated with Doppler effects) in the range direction (e.g., range derivative). This concept is expressed in the equations Eq. (1)-(3) above. These components alternate relative sign between upchirp and downchirp data points. In the absence of, for example, a counter chirp LIDAR architecture, multiple time points are processed to determine range and velocity.

In some implementations, a differential equation can be solved to determine the time histories of range and the range derivative. In some known applications, such as in metrology applications, simple approximations can be made, such as constant velocity, to estimate range and velocity, or to average over time and assume that range is constant and velocity averages to zero. This approach can result in a slow measurement process in environments in which vibration is significant (the significance or tolerance which can be determined using, for example, Eq. (2) as described above). In contrast, the LIDAR system 100 with multiple lasers (e.g., closely-spaced laser beams) can greatly accelerate the measurement process, while yielding significant improvements in relative and absolute range estimates and relative azimuth and elevation estimates.

Specifically, in some implementations of the LIDAR system 100, absolute and relative range accuracy improvement can be implemented because the vibration velocity field can be slowly varying as a function of position. Therefore, the velocity values (e.g., magnitudes) at relatively closely spaced points will be nearly the same or, in the worst case, may be approximated as linearly varying in value as a function of history and/or lateral distance. In some implementations, the velocity values at closely spaced points will be nearly the same or, in the worst case, may be approximated as linearly varying in value as a function of x and y, if z is the Cartesian coordinate in the direction of the LIDAR beams. In some implementations, for a rigid solid object, instantaneous z-velocity can vary exactly linearly as a function of x and y. Therefore, the differential equations to be solved for range and velocity time history at each point can be linked to each other. By solving for the range and velocity fields simultaneously there will be a reduction in error. In some implementations of the LIDAR system 100, a reduction in relative range error between local points can be implemented because the points are measured simultaneously and the possibility of range motion is eliminated. In some implementations, a substantial reduction in relative azimuth and elevation error can exist between local points because the relative azimuth and elevation of these points results from the rigid structure of the multiple beam array of the LIDAR system 100. In some implementations, multiple measurements can be performed simultaneously in the LIDAR system 100, which can result in time or speed efficiencies. For many metrology processes, features can be measured by measuring many relatively closely spaced points. A speed advantage can be obtained by measuring multiple points simultaneously.

In some implementations, the LIDAR system 100 can have multiple beams from the laser subsystems 105A through 105N where simultaneous measurements using the multiple beams results in simultaneous estimates of both range and/or velocity at each beam location, and the various beam locations are spatially close enough to have substantially the same velocity (Doppler component). In other words, in some implementations, the LIDAR system 100 can have a first laser beam transmitted at a time at a first location from the laser subsystems 105A and a second laser beam transmitted at the same time from the laser subsystem 105N at a second location where simultaneous measurements calculated using the first and second laser beams result in simultaneous estimates of both range and/or velocity at each of the first and second beam locations, and the first and second beam locations can be spatially close enough such that Doppler shifts for the first and second laser beams may be substantially the same or linearly related. In some implementations, the measurements from the LIDAR system 100 can be processed together by the analyzer 170 to estimate the constant or linearly varying velocity of the surface, and this estimated velocity can be used by the analyzer 170 to correct the range estimates at each of the beam locations.

In some implementations, measurements at multiple times can be used by the analyzer 170 to estimate a time history (e.g., evolution) of the ranges and velocities to further improve the estimates of range (and velocity). For example, a first set of simultaneous measurements at a first time can be used by the analyzer 170 with a second set of simultaneous measurements at a second time to produce at least a portion of a time history of ranges and/or velocities. These different sets of simultaneous measurements can be used by the analyzer 170 to further improve estimates of the ranges and/or velocities.

In some implementations, the LIDAR system 100 can be configured such that multiple simultaneous measurements at points at a particular time produced by the LIDAR system 100 can be used by the analyzer 170 to improve relative range between the points at the particular time independent of absolute range accuracy. We can rearrange equation 2 to yield $$\text{Range} = (F/HZPM + LO)/2 - (v/c) * F0/HZPM/2 \qquad \text{Eq. (5)}$$

For each beam. The relative range for each measurement is the difference between these measurements, so that if v is the same for each beam, then the relative range does not depend on the velocity.

In some implementations, the LIDAR system 100 can be configured such that a rigid physical structure defines the relative positions of the multiple beam array produced by the laser subsystems 105A through 105N of the LIDAR system 100. This known set of relative positions can be used by the analyzer 170 to produce improved relative measurements of x, y, and/or z locations of each of the measured points by the laser subsystems 105A through 105N.

In some implementations, the LIDAR system 100 can have an increased usable data rate because multiple points can be measured simultaneously, each point can have increased absolute accuracy, and/or each point can have increased relative accuracy as described above.

Figure 2:
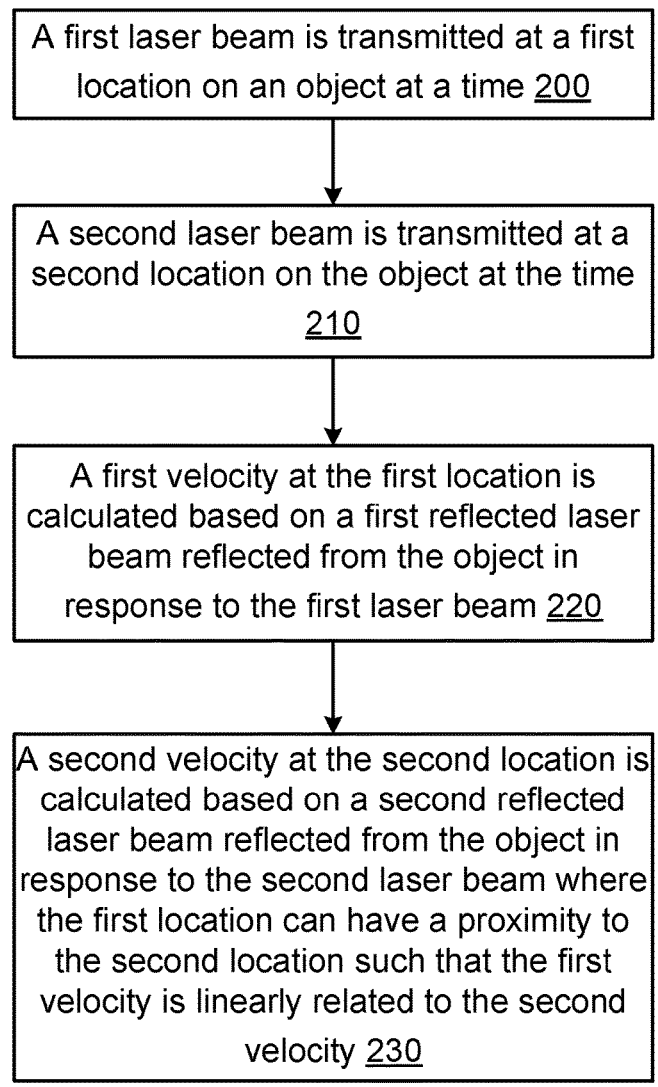
FIG. 2 illustrates a process related to the embodiments described herein.

FIG. 2 illustrates a process related to the embodiments described herein. As shown in the flowchart, a first laser beam is transmitted at a first location on an object at a time (block 200). The first laser beam can be transmitted by a first laser subsystem (e.g., one of the laser subsystems 105). A second laser beam is transmitted at a second location on the object at the time (e.g., at the same time) (block 210). The second laser beam can be transmitted by a second laser subsystem.

As shown in FIG. 2, a first velocity at the first location is calculated based on a first reflected laser beam reflected from the object in response to the first laser beam (block 220). The calculations can be performed by an analyzer (e.g., the analyzer 170). In some implementations, a first range can be calculated at the first location based on the first reflected laser beam.

A second velocity at the second location is calculated based on a second reflected laser beam reflected from the object in response to the second laser beam where the first location can have a proximity to the second location such that the first velocity is linearly related to the second velocity (block 230). The calculations can be performed by an analyzer. In some implementations, a second range can be calculated at the second location based on the second reflected laser beam.

In some implementations, one or more portions of the components shown in, for example, the laser system 100 and/or the laser subsystem 105A in FIGS. 1A and 1B can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the laser subsystem 105A can be, or can include, a software module configured for execution by at least one processor (not shown). In some implementations, the functionality of the components can be included in different modules and/or different components than those shown in FIGS. 1A and 1B.

In some embodiments, one or more of the components of the laser subsystem 105A can be, or can include, processors configured to process instructions stored in a memory. For example, the analyzer 170 (and/or a portion thereof) can be a combination of a processor and a memory configured to execute instructions related to a process to implement one or more functions.

Although not shown, in some implementations, the components of the laser subsystem 105A (or portions thereof) can be configured to operate within, for example, a data center (e.g., a cloud computing environment), a computer system, one or more server/host devices, and/or so forth. In some implementations, the components of the laser subsystem 105A (or portions thereof) can be configured to operate within a network. Thus, the laser subsystem 105A (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the laser subsystem 105A.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A LIght Detection And Ranging (LIDAR) system, comprising:
   a first laser subsystem configured to transmit a first laser beam at a first location on an object at a time;
   a second laser subsystem configured to transmit a second laser beam at a second location on the object at the time; and
   an analyzer configured to analyze data based on laser beams produced by the LIDAR system, the analyzer configured to calculate a first velocity based on a first reflected laser beam reflected from the object in response to the first laser beam, the analyzer configured to calculate a second velocity based on a second reflected laser beam reflected from the object in response to the second laser beam, the analyzer configured to detect a vibration velocity field over the object;
   the first location being targeted by the first laser subsystem and the second location being targeted by the second laser subsystem such that the first velocity is substantially the same as the second velocity while the vibration velocity field is being detected.

2. The LIDAR system of claim 1, wherein the first velocity and the second velocity correspond with the time.

3. The LIDAR system of claim 1, wherein the first laser subsystem includes a laser source, a splitter and a delay, the splitter being disposed between the laser source and the delay.

4. The LIDAR system of claim 1, wherein the first laser subsystem includes a laser source, a delay and a combiner, the delay being disposed between the combiner and the laser source.

5. The LIDAR system of claim 1, wherein the analyzer is configured to calculate a constant velocity of a surface of the object, the analyzer is configured to correct the first velocity based on the constant velocity of the surface.

6. The LIDAR system of claim 1, wherein the analyzer is configured to calculate a varying velocity of a surface of the object, the analyzer is configured to correct the second velocity based on the varying velocity of the surface.

7. The LIDAR system of claim 1, wherein the first velocity and the second velocity are included in a first set of simultaneous measurements, the time is a first time,
   the first laser subsystem configured to transmit a third laser beam at a third location on the object at a second time;
   the second laser subsystem configured to transmit a fourth laser beam at a fourth location on the object at the second time,
   the analyzer configured to calculate a third velocity based on a third reflected laser beam from the third laser beam, the analyzer configured to calculate a fourth velocity based on a fourth reflected laser beam from the fourth laser beam,
   the third velocity and the fourth velocity are included in a second set of simultaneous measurements,
   the analyzer configured to modify the first velocity based on first set of simultaneous measurements and the second set of simultaneous measurements.

8. The LIDAR system of claim 1, wherein the first velocity is a first estimated velocity calculated based on the first reflected laser beam and the second velocity is a second estimated velocity calculated based on the first reflected laser beam and the second reflected laser beam.

9. A LIght Detection And Ranging (LIDAR) system, comprising:
   a first laser subsystem configured to transmit a first laser beam at a first location on an object at a time;
   a second laser subsystem configured to transmit a second laser beam at a second location on the object at the time; and
   an analyzer configured to analyze data based on laser beams produced by the LIDAR system, the analyzer configured to calculate a first velocity based on a first reflected laser beam reflected from the object in response to the first laser beam, the analyzer configured to calculate a second velocity based on a second reflected laser beam reflected from the object in response to the second laser beam, the analyzer configured to detect a vibration velocity field over the object,
   the first location having a proximity to the second location such that the first velocity is linearly related to the second velocity while the vibration velocity field is being detected.

10. The LIDAR system of claim 9, wherein the analyzer is configured to calculate a constant velocity of a surface of the object, the analyzer is configured to correct the first range based on the constant velocity of the surface.

11. The LIDAR system of claim 9, wherein the analyzer is configured to calculate a varying velocity of a surface of the object, the analyzer is configured to correct the first range based on the varying velocity of the surface.

12. The LIDAR system of claim 9, wherein the analyzer is configured to calculate a relative range between the first location and the second location at the time independent of absolute range accuracy.

13. The LIDAR system of claim 9, wherein the first laser subsystem is fixedly located with respect to the second laser subsystem.

14. The LIDAR system of claim 9, wherein the first range is a first estimated range calculated based on the first reflected laser beam and the second velocity is a second estimated range calculated based on the first reflected laser beam and the second reflected laser beam.

15. The LIDAR system of claim 1, wherein each of the first velocity and the second velocity includes information concerning respective velocity components parallel to and orthogonal to the first and second laser beams.

16. The LIDAR system of claim 15, wherein the information concerning each of the velocity components parallel to and orthogonal to the first and second laser beams is produced by the analyzer based on the first and second reflected laser beams, respectively.

17. The LIDAR system of claim 9, wherein each of the first velocity and the second velocity includes information concerning respective velocity components parallel to and orthogonal to the first and second laser beams.

18. The LIDAR system of claim 17, wherein the information concerning each of the velocity components parallel to and orthogonal to the first and second laser beams is produced by the analyzer based on the first and second reflected laser beams, respectively.

19. A method, comprising:
- detecting a vibration velocity field over an object
- transmitting a first laser beam at a first location on the object at a time;
- transmitting a second laser beam at a second location on the object at the time;
- generating a first velocity based on a first reflected laser beam reflected from the object in response to the first laser beam;
- generating a second velocity based on a second reflected laser beam reflected from the object in response to the second laser beam,
- the first location being targeted by the first laser subsystem and the second location being targeted by the second laser subsystem such that the first velocity is substantially the same as the second velocity while the vibration velocity field is being detected.

20. The method of claim 19, wherein each of the first velocity and the second velocity includes information concerning respective velocity components parallel to and orthogonal to the first and second laser beams.

\* \* \* \* \*

UNITED STATES PATENT AND TRADEMARK OFFICE
CERTIFICATE OF CORRECTION

PATENT NO. : 10,502,833 B2
APPLICATION NO. : 14/994998
DATED : December 10, 2019
INVENTOR(S) : Richard Sebastian Page 1 of 1

It is certified that error appears in the above-identified patent and that said Letters Patent is hereby corrected as shown below:

In the Claims

In Claim 19, Column 11, Line 4, delete "object" and insert -- object; --, therefor.

Signed and Sealed this
Eighteenth Day of August, 2020

Andrei Iancu
*Director of the United States Patent and Trademark Office*